(12) United States Patent
Cheek

(10) Patent No.: US 9,569,981 B1
(45) Date of Patent: Feb. 14, 2017

(54) MATHEMATICS TEACHING AID

(71) Applicant: David Duncan Cheek, Springfield, MO (US)

(72) Inventor: David Duncan Cheek, Springfield, MO (US)

( * ) Notice: Subject to any disclaimer, the term of this patent is extended or adjusted under 35 U.S.C. 154(b) by 473 days.

(21) Appl. No.: 13/904,192

(22) Filed: May 29, 2013

Related U.S. Application Data

(60) Provisional application No. 61/741,725, filed on Jul. 26, 2012.

(51) Int. Cl.

| | |
|---|---|
| G09B 19/00 | (2006.01) |
| G09B 23/26 | (2006.01) |
| G09B 17/00 | (2006.01) |
| G09B 19/02 | (2006.01) |
| G09B 1/06 | (2006.01) |
| G09B 1/00 | (2006.01) |
| G09B 1/04 | (2006.01) |
| G09B 1/16 | (2006.01) |
| G09B 1/36 | (2006.01) |
| A63H 33/04 | (2006.01) |
| A63H 33/00 | (2006.01) |
| A63F 9/08 | (2006.01) |
| A63F 9/12 | (2006.01) |

(52) U.S. Cl.
CPC ............ *G09B 19/00* (2013.01); *A63F 9/088* (2013.01); *A63F 9/1208* (2013.01); *A63H 33/00* (2013.01); *A63H 33/04* (2013.01); *G09B 1/00* (2013.01); *G09B 1/04* (2013.01); *G09B 1/06* (2013.01); *G09B 1/16* (2013.01); *G09B 1/36* (2013.01); *G09B 17/00* (2013.01); *G09B 19/0023* (2013.01); *G09B 19/02* (2013.01); *G09B 23/26* (2013.01)

(58) Field of Classification Search
USPC ......................................................... 434/209
See application file for complete search history.

(56) References Cited

U.S. PATENT DOCUMENTS

| | | | |
|---|---|---|---|
| 1,720,499 A | 7/1926 | Walker | |
| 3,584,400 A * | 6/1971 | Voges | ................... G09B 27/08 |
| | | | 428/542.8 |
| 3,949,491 A | 4/1976 | Harte | |

(Continued)

OTHER PUBLICATIONS

National Assessment of Educational Progress at Grades 4 and 8, NCES 2012-458, 2011, Figure C, p. 2, National Center for Education Statistics, National Report Card, Mathematics 2011.

(Continued)

*Primary Examiner* — Xuan Thai
*Assistant Examiner* — James Hull
(74) *Attorney, Agent, or Firm* — Richard L. Marsh

(57) ABSTRACT

An aid for teaching mathematical concepts looks like a multiplication table but has separable rows of numbers. In the first row, cardinal numbers 1-n are displayed and second-N rows have cardinal numbers 2-n displayed along side one edge on the face. The remainder of the rows have the multiplication products of the cardinal numbers on the first row and the cardinal numbers of the rest of the rows arranged at the intersections of the cardinal numbers at the top and along side the edge. The rows are separable so they may be arranged in a multiplicity of pairs of fractional equivalents.

2 Claims, 7 Drawing Sheets

(56) References Cited

U.S. PATENT DOCUMENTS

| | | | | | |
|---|---|---|---|---|---|
| 3,999,310 | A | * | 12/1976 | Lufkin | G09B 19/02 |
| | | | | | 434/208 |
| 4,323,244 | A | * | 4/1982 | Busing | A63F 9/12 |
| | | | | | 156/73.1 |
| 5,192,077 | A | * | 3/1993 | Caicedo | A63F 9/088 |
| | | | | | 273/155 |
| 5,997,305 | A | * | 12/1999 | Mangles | G09B 19/02 |
| | | | | | 434/188 |
| 7,828,553 | B2 | | 11/2010 | Berg | |

OTHER PUBLICATIONS

Gordon Dryden and Jeannette Vos,"Unlimited, The New Learning Revolution and the Seven Keys to Unlock It," The Learning Web Limited, P.O. Box 87209, Meadowbank, Auckland, New Zealand, chapter 3, p. 130, Nov. 2008.

* cited by examiner

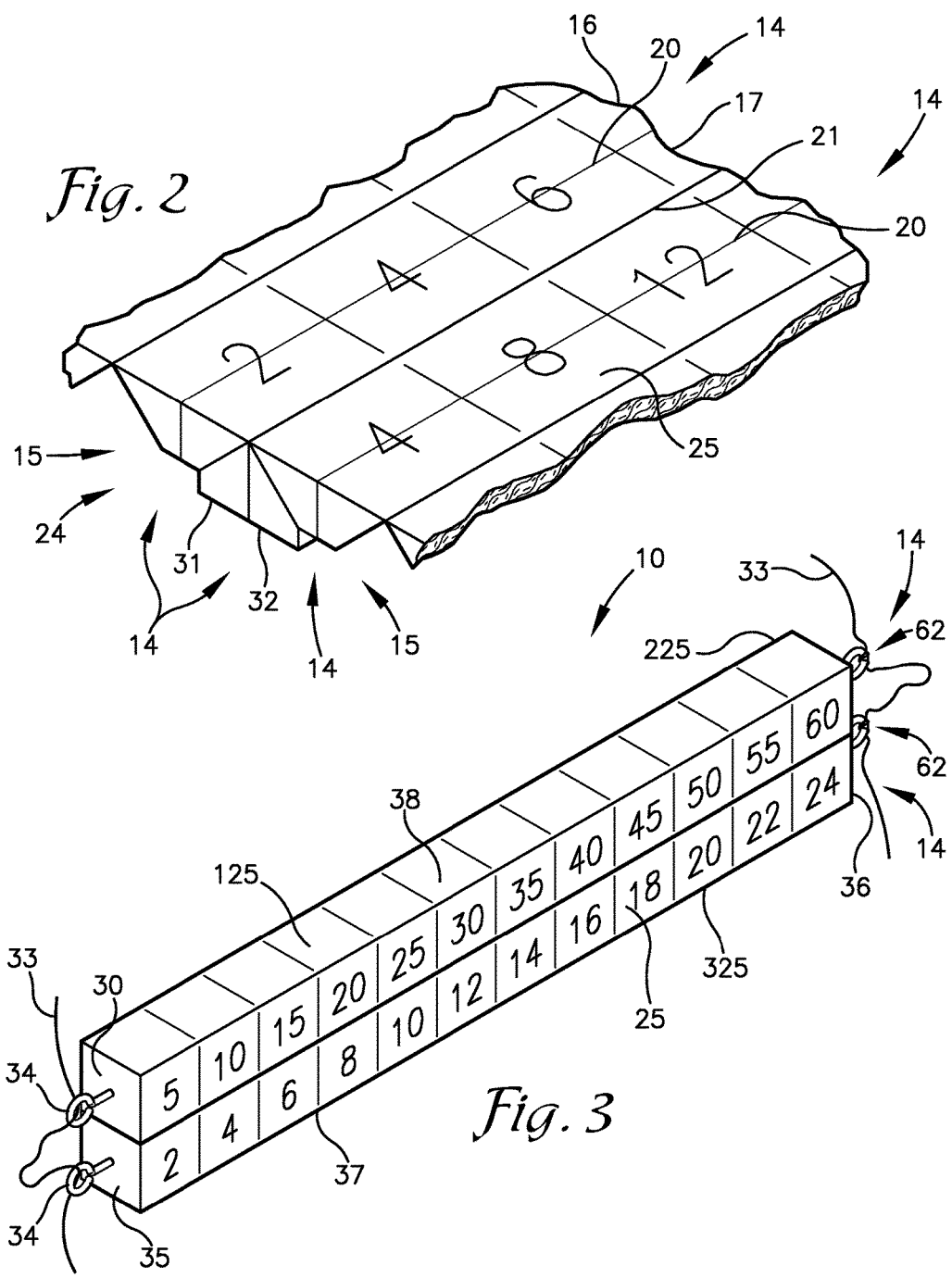

MATHEMATICS TEACHING AID

RELATED APPLICATION DATA

This application is a non-provisional application of Applicant's provisional application Ser. No. 61/741,725 filed on 26 Jul. 2012, Applicant claiming the priority date established therein and incorporating the entirety of the disclosure thereof into this application with this reference thereto.

BACKGROUND OF THE INVENTION

1. Field of the Invention

This invention relates to an aid for teaching mathematics and more particularly multiplication, division and fractions.

2. Prior Art Statement

Currently, the most widely used approach to teaching mathematics involves having students watch a teacher explain concepts and solve sample problems on a chalkboard, a whiteboard, or via a TV screen (through videos or some kind of a PowerPoint presentation); and then the students are expected to be able to remember, reproduce, and generalize what they have seen. This highly visual method does not succeed with every student. According to recently published results in National Center for Education Statistics, National Report Card, Mathematics 2011, NATIONAL ASSESSMENT OF EDUCATIONAL PROGRESS AT GRADES 4 AND 8, NCES 2012-458, 2011, Figure C, page 2, only about thirty percent of eighth grade students (in the United States) score at a proficient level (or higher) on mathematics standardized tests. Therefore, some seventy percent of U.S. students could use a new approach, or many new approaches, to help them attain proficiency. Additionally, simple research conducted by Gordon Dryden and Jeannette Vos as detailed in chapter 3 and more particularly on page 130 in their book "UNLIMITED, The New Learning Revolution and the Seven Keys to Unlock It," November 2008 available from International Sales Office, The Learning Web Limited, P.O. Box 87209, Meadowbank, Auckland, New Zealand, finds that some twenty-five percent to forty percent of students are kinesthetic learners (as opposed to visual learners or auditory learners). Kinesthetic learners do not learn as well from straight visual methods, such as a PowerPoint presentation or the lectures mentioned above, but instead learn better by using something they can touch, feel, move with their hands, or get physically involved with. Critical to STEM (Science, Technology, Engineering and Mathematics) is a thorough understanding of the basics of mathematics. Therefore, there is an unfulfilled need for a simple mathematics teaching aid to advance STEM wherein a student may easily learn fractions, fractional equivalents and multiplication products.

It is known to provide a pair of concentric cylinders disposed over a pencil. The outer cylinder has a longitudinal slot with the series of numbers 1-9 immediately above the slot and has an aperture to the left of the series of numbers. The inner cylinder has a plurality of lines of numbers disposed longitudinally along the exterior surface that are products of multiplication, these lines aligned for display through the slot of the outer cylinder. Aligned in circumferential arrangement with the lines of numbers is an annular row of numbers 1-9. By rotating the inner cylinder with respect to the outer cylinder, the number appearing in the aperture will display all the products of that number multiplied by the series of numbers above the slot. For instance, see the U.S. Pat. No. 1,720,499 issued on Jul. 1, 1926 to William Walker. Though the device of Walker shows a multiplier and a series of multiplicands, a complete multiplication table is not present nor can a plurality of fractional equivalents of various sets be instantly displayed. Furthermore, the cylinders of the pencil of Walker can easily be lost rendering the device unusable. Thus, there is a need for an aid for teaching mathematical concepts comprising a plurality of elongated elements provided with numbers on at least one face thereof, the plurality of elements adapted to be arranged in a multiplicity of sets wherein the sets present ordered pairs of fractions, multiplication products and division products.

It is known to provide a rod that has a plurality of identical shapes slidable but non rotatable upon the rod. Every facet of each shape has the same number but may have a different color. For instance, see the U.S. Pat. No. 7,828,553 issued on Nov. 9, 2010 to Carla Berg. The device is said to teach students counting by sets however, there is no means of placing pairs of rods together to teach fractions or to present a complete multiplication table. Additionally, the separate rods do not lend themselves to be instantly configured into varied sets and may also be misplaced. Accordingly, there is a need for an aid for teaching mathematical concepts comprising a plurality of elongated elements provided with numbers on at least one face thereof wherein the plurality of elements are joined together and adapted to be arranged in a multiplicity of sets to readily present ordered pairs of fractions, multiplication products and division products.

It is also known to provide a plurality of equal sized weights used on a balance beam to teach math concepts. By using fractional sized weights, fractional math may be taught. For instance, see the U.S. Pat. No. 3,949,491 issued on Apr. 13, 1976 to James Richard Harte. It is readily apparent that the plurality of parts may easily be lost and thus render the device unfit for continued use. Furthermore, no complete fractional table or plurality of fractional equivalents may be shown nor can the balance beam be utilized to display varied sets of fractions. Therefore, the need for a mathematics teaching aid that comprises a plurality of elongated elements flexibly joined together wherein each element is placeable adjacent any other element thus presenting a plurality of fractional units to a learner manipulating said plurality of elongated elements.

It is further known to provide an abacus frame carrying polygonal blocks having letters and numerals rotatably disposed upon the wires of the frame. Math principles may be taught by properly rotating the blocks to present sums, remainders, products and quotients. For instance, see the U.S. Pat. No. 422,612 issued on Mar. 4, 1890 to Christiana Neuhaus. Though fractions are shown on some blocks, showing fractions comprised of whole numbers is difficult and beyond the scope of the invention. Furthermore, a complete multiplication table is not available nor can the device be instantly reconfigured into fractional sets. Therefore, there has long been a need for a tool for teaching multiplication, division and fractions comprised of a plurality of elongated bars of specific cross sectional shape, at least one longitudinal face of each elongated bar provided with a first number adjacent one end and multiples of the first number disposed at spaced intervals along the longitudinal face where the elongated bars may be joined together in any sequence.

Likewise, it is known to provide a flat case with a multiplication table printed on one half of a base wherein the multiplication table may be observed through slots in a cover plate. Numbers from 1-10 are printed along the left side and across the top of the one half of the cover plate. Opaque slides are provided to slide within the slots of the cover plate. For instance, see the U.S. Pat. No. 6,769,914 B2 issued on Aug. 3, 2004 to Kalyani Sundararajan. Though equivalent fractions of adjacent sets of numbers may be displayed, there is no means to display equivalent fractions of non-adjacent sets as the device may not be reconfigured to place any number row adjacent any other number row. Obviously, there is still a great need for an aid for teaching mathematical concepts comprising a plurality of elongated elements provided with numbers on at least one face thereof with the plurality of elements adapted to be arranged in a multiplicity of sets thus presenting ordered pairs of fractions, multiplication products and division products to a student manipulating the elements into the different sets.

Yet another known teaching device is a flat case with a plurality of square channels disposed through one edge. The opposed edge is blocked. Numbers 1-9 are printed on the face of the case aligned with each channel. Adjacent each number are two apertures through the face of the case. Next to the second aperture is the equality sign. In the first channel, a third aperture is disposed through the case and diagonally from the third aperture in the first channel are third apertures in each of the remaining channels. Each bar is provided with one of the four math symbols that appears in the first aperture and adjacent the math symbol is a number. Each bar has a different number in the second position such that any bar may be inserted into any channel For instance, see the U.S. Pat. No. 3,743,750 issued on Jul. 3, 1973 to Motoi Hurue. As the blocks need to inserted into and removed from the channels, the likelihood of loss is great. Additionally, fractions and fractional equivalents may not be taught using this device. Apparently, the need for a flexible tool table that may be readily manipulated into multiple configurations showing various fractions and fractional equivalents is still great.

Fractional strips have long been used, and are still being used to show how many fractional units of a given size make up a whole. For instance, see the U.S. Pat. No. 1,174,689 issued on Mar. 7, 1916 to Frank J. Coleman. Equivalent fractions cannot be taught with this device. Additionally, the multiple parts may easily be misplaced. Furthermore, there is no multiplication table so the need for an integrated teaching aid showing a complete multiplication table with equivalent fractions on adjacent pairs of elements which can also be reconfigured to show equivalent fractions of non adjacent pairs of elements.

SUMMARY OF THE INVENTION

One object of this invention is to provide a teaching aid for mathematics that is held in the hands and manipulated by the student to present various combinations of numbers to the student for learning of fractions and fractional equivalents.

Another object of this invention is to provide a teaching aid for math-at-risk students to better see and better understand relationships between numbers.

A primary goal of this invention is to provide a teaching aid for math-at-risk students to recognize fractional equivalents and to solve fraction problems.

A significant feature of this invention is to provide a teaching aid for math-at-risk students to reinforce math skills through the continued learning of multiplication tables.

A main purpose of this invention is to provide a mathematics teaching aid of a plurality of elongated elements flexibly joined together where each element may be placed adjacent any other element thus presenting a plurality of equivalent fractional units to a learner manipulating the elongated elements.

A primary principle of this invention is to provide a tool for teaching multiplication, division and fractions comprising a plurality of elongated bars of specific cross sectional shape, at least one longitudinal face of each elongated bar provided with a first number adjacent one end and multiples of the first number disposed at spaced intervals along the longitudinal face where the elongated bars may be joined together in any sequence to show a multiplicity of equivalent fractions.

A principal aim of this invention is to provide an aid for teaching mathematical concepts comprising a plurality of elongated elements provided with numbers on at least one face thereof where the plurality of elements may be arranged in a multiplicity of sets wherein the sets present ordered pairs of fractions, multiplication products and division products to a student manipulating the elements into the sets.

One primary aim of this invention is to provide an aid for teaching mathematical concepts comprising a multiplication table provided with separable rows of numbers where a first row has cardinal numbers 1-n displayed on a face thereof and second-N rows have cardinal numbers 2-n displayed on a face thereof in a first position with multiplication products of the cardinal numbers of the first row and cardinal numbers 2-n of the second-n rows arranged at intersections of the cardinal numbers and wherein the separable rows of numbers may be arranged in a multiplicity of pairs of fractional equivalents.

BRIEF DESCRIPTION OF THE DRAWINGS

FIG. 2 is an enlarged partial perspective view of two flexibly joined rows of the preferred embodiment paired together showing one set of equivalent fractions wherein a third row is shown folded under and between the pair of flexibly joined rows.

FIG. 3 is a perspective view of two loosely joined rows of alternate embodiments of the invention with pairing of the rows to teach improper fractional equivalents.

DESCRIPTION OF THE PREFERRED EMBODIMENTS

Figure 1:
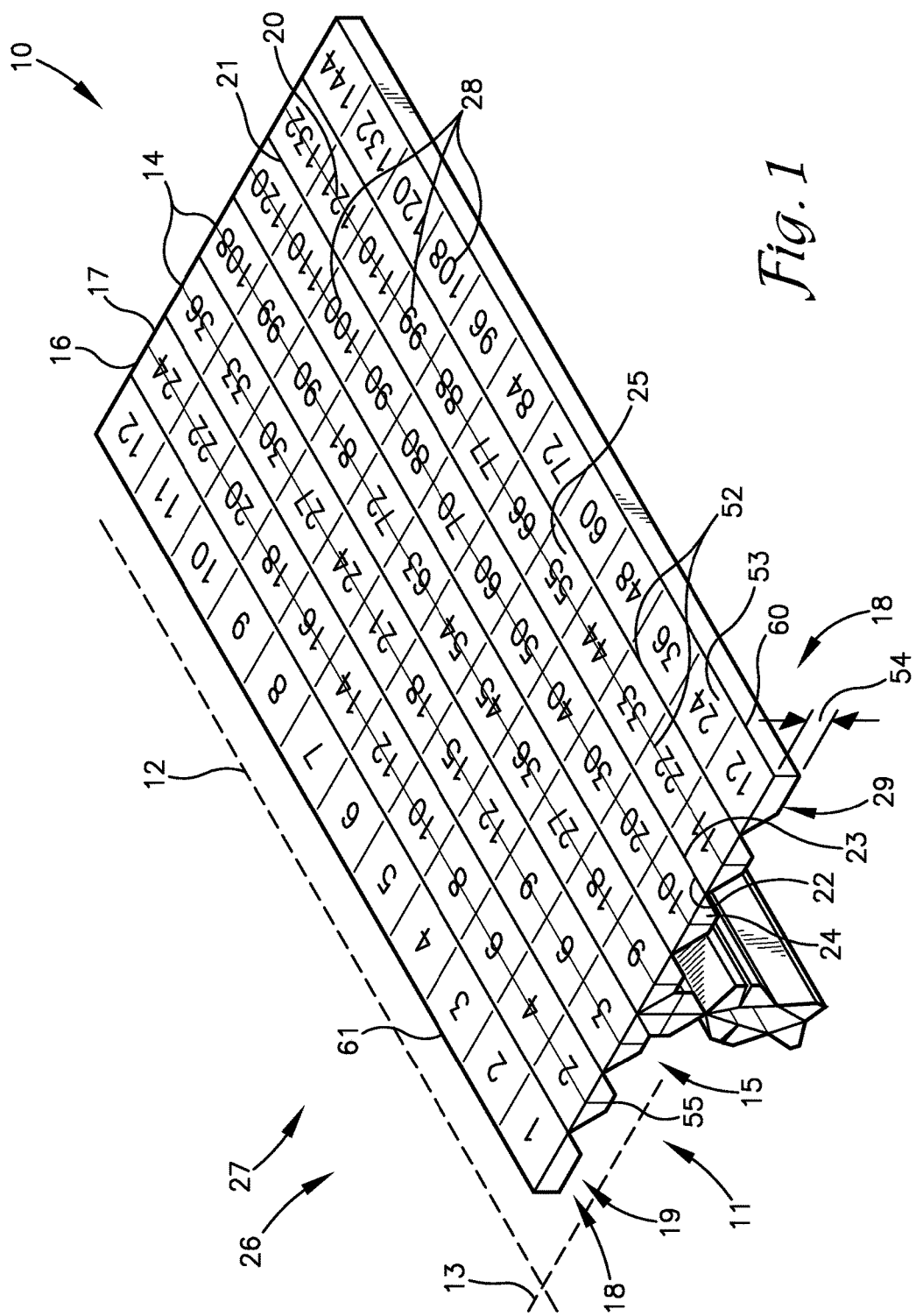
FIG. 1 is a perspective view of the preferred embodiment of the teaching aid of this invention arranged in a multiplication table with five rows displaced below the top surface.

Referring now to FIG. 1, use of this teaching aid, generally described with the number 10 will benefit all mathematics students, but the students who will benefit the most are the ones who are on the road to stating "I hate math." It can be argued that these eventual math-haters often fall into a pattern where they do not thoroughly learn their multiplication basic facts (i.e. the multiplication table—which is a highly visual, "memorize this" effort), then they do poorly with fractions (which often depends on multiples), and then they do poorly in algebra (which often depends on fractions). Teaching aid 10 will especially help these math-at-risk students as it will: (A) help them to better see and better understand relationships between numbers; (B) help them get answers to fraction problems; and (C) reinforce the thorough learning of multiplication tables while helping with (A) and (B). Instead of failing at fractions and learning to hate math, students using teaching aid 10 will have success with fractions and continue learning their multiplication facts, which will quite possibly keep them out of the "I hate math" category.

Jointly considering FIGS. 1-9, in general teaching aid 10 can be described as a table 11 that is rigid with regard to one axis, herein depicted as the horizontal axis 12 while remaining flexible along the other axis, herein the vertical axis 13. Because teaching aid 10 is flexible, it is easy to manipulate so that one can examine two rows 14 of information while not seeing, or ignoring the rest of the rows 14. In the preferred embodiment of FIG. 1, and as more clearly shown in FIG. 2, it has been found by the inventor hereof that rows 14 are trapezoidal in cross section wherein trapezoidal elements 15 of rows 14 are divided along a central line 20 into a top half 16 and a bottom half 17. As will be fully explained hereinafter in a method of manufacture of this embodiment top half 16 and bottom half 17 may be flexibly joined by alternate methods in order to accomplish the objects of this invention. Additionally, the alternate methods of flexibly joining top half 16 and bottom half 17 may also be applied to adjacent rows 14 at a juncture 21 of a top edge 22 of a top half 16 of a trapezoidal element 15 of one row 14 and a bottom edge 23 of a bottom half 17 of trapezoidal element 15 of a row 14 above as shown in FIG. 1 between rows 14 having numbers "10" and "11" adjacent a left edge 24 thereof. As can be readily observed in FIGS. 1, 4, 6 and 7, a first row 19 of rows 14 has cardinal numbers 18 with numbers 1-n displayed on the observed face 25 thereof and a left hand column 26 of all rows 14 has cardinal numbers 18 with numbers 1-n displayed adjacent left edge 24 thereof. Adjacent columns 27 display the products of the cardinal numbers 18 at the juncture of the respective column 27 and the row 14 wherein all numerals 28 on observed face 25 of the table 11 are divided in half by central line 20 such that table 11 becomes a multiplication table. Since trapezoidal elements 15 may be flexibly manipulated along central lines 20 and rows 14 may be flexibly manipulated along junctures 21, it is readily apparent then that any lower one of rows 14 may be placed adjacent any upper one of rows 14 to present equivalent fractions for display to the student.

For instance, in teaching aid 10 where n=12, thus having a total of twelve rows 14 and 12 columns were manipulated by the student to show the third and the ninth rows 14 as shown in FIG. 1, the numerals 28 shown would be as follows:

| 3 | 6  | 9  | 12 | 15 | 18 | 21 | 24 | 27 | 30 | 33 | 36  |
|---|----|----|----|----|----|----|----|----|----|----|-----|
| 9 | 18 | 27 | 36 | 45 | 54 | 63 | 72 | 81 | 90 | 99 | 108 | and thus all the equivalent fractions with the cardinal number three as the numerator in the first fraction are displayed. With a small bit of explanation (that these are various representations of the fraction 3/9), the student will see that 3/9 is equal to 6/18 is equal to 9/27 is equal to 12/36, etc. . . . and can grasp that these are all just various representations of the same number fraction 3/9 because they are based on the multiples of 3 and the multiples of 9. With a little bit more guidance by a teacher, the student may then find another pair of rows 14 where the fraction 3/9 appears to find lesser fractional equivalents and in fact, first row 19 of rows 14 paired with row 14 displaying the cardinal number three used in the pair above will display the lower fractional equivalents of 1/3 not found in the initial pairing, ie., 1/3 and 2/6 as well as 3/9 which evoked the second search. The three rows 14 paired together would then be as follows:

TABLE 1

| 1 | 2  | 3  | 4  | 5  | 6  | 7  | 8  | 9  | 10 | 11 | 12  |
|---|----|----|----|----|----|----|----|----|----|----|-----|
| 3 | 6  | 9  | 12 | 15 | 18 | 21 | 24 | 27 | 30 | 33 | 36  |
| 9 | 18 | 27 | 36 | 45 | 54 | 63 | 72 | 81 | 90 | 99 | 108 |

Likewise, after the guidance above, the student should readily find another pair of rows 14 where the fraction 4/12 appears to find greater fractional equivalents of 1/3 not found in the initial pairing and in fact, last row 29 of rows 14 paired with row 14 displaying the cardinal number four used in the pair above will display the higher fractional equivalents of 1/3, ie., 40/120 and 44/132 as well as 48/144 which evoked the second search and these two rows 14 together would be as follows:

TABLE 2

| 4  | 8  | 12 | 16 | 20 | 24 | 28 | 32 | 36  | 40  | 44  | 48  |
|----|----|----|----|----|----|----|----|-----|-----|-----|-----|
| 12 | 24 | 36 | 48 | 60 | 72 | 84 | 96 | 108 | 120 | 132 | 144 |

It should become readily apparent then that other pairs of rows 14 will result in the display of other fractional equivalents. For instance, if the third row 14 is paired with the tenth row 14, the equivalent fraction to be observed would be:

TABLE 3

| 3  | 6  | 9  | 12 | 15 | 18 | 21 | 24 | 27 | 30  | 33  | 36  |
|----|----|----|----|----|----|----|----|----|-----|-----|-----|
| 10 | 20 | 30 | 40 | 50 | 60 | 70 | 80 | 90 | 100 | 110 | 120 | whereupon one can see that 3/10 is equal to 6/20 is equal to 9/30 is equal to 12/40, etc. Thus, teaching aid 10, using a 12×12 multiplication grid on observed face 25, can easily demonstrate the first twelve versions of all of the fractions from halves to twelfths. Though a 12×12 multiplication grid is shown as a preferred size, any size grid would work, and for a classroom, a much larger multiplication grid may be desired. The preferred embodiment of the FIGS. 1 and 2, as well as the alternate embodiments in FIGS. 3-8 have been sized to be inserted into students' three-ring binder notebooks or into pocket file folders and thus the preferred size of teaching aid 10 is approximately eight and one-half inches wide along horizontal axis 12 by approximately eleven inches in length along vertical axis 13.

Teaching aid 10 may be used to find the least common multiple of three and ten by looking down the display of the multiples in both row 14 starting with the number three (3) and row 14 starting with the number ten (10) and find the lowest number that is in both lists wherein one finds that number thirty (30) is the least common multiple. In likewise fashion, teaching aid 10 may be used to convert 3/10 to an equivalent fraction, for instance in order to change 3/10 to a fraction with a different denominator the student would simply choose the fraction with the desired denominator or numerator as the first 12 equivalent fractions up to 120ths in the case of 3/10 are shown. As is readily apparent, this avoids a classroom step where you tell the children "do whatever you did to the bottom to the top" at which a lot of students fail to understand, give up and start hating math. Furthermore, the student can learn that ratios and proportions are really the same concept as equivalent fractions as the first 12 equivalent ratios and proportions are shown on table 11 and obviously, greater numbers of equivalent ratios and proportions on larger tables 11.

As will be noted with the preferred embodiment and many of the alternative structures of teaching aid 10 (discussed below), the proper fraction orientation is fixed (i.e. the low number rows 14 are above the higher number rows 14) because teaching aid 10 is fixed into a single table 11 due to its structure. To work with improper fractions using table 11, rows 14 are simply inverted in placement such that observed face 25 displays the higher numbers above the lower numbers with row numbers printed presented from 12 to 1 instead of 1 to 12. Thus, improper fractions would appear as follows:

TABLE 4

| 3 | 6 | 9 | 12 | 15 | 18 | 21 | 24 | 27 | 30 | 33 | 36 |
|---|---|---|----|----|----|----|----|----|----|----|----|
| 2 | 4 | 6 | 8  | 10 | 12 | 14 | 16 | 18 | 20 | 22 | 24 | and one would find that 3/2 is equal to 6/4 is equal to 9/6 is equal to 12/8, etc. Other alternative embodiments discussed below may present either proper or improper fractions as will become apparent with a further reading of this description.

Referring now to FIG. 3, though rows 14 are trapezoidal elements 15 in the preferred embodiment of teaching aid 10, rows 14 may be other shapes as well but a different construction of teaching aid 10 is then dictated. Rows 14 in FIG. 3 are square in cross section thus creating square section elements 30 each having four faces 25, 125, 225, 325 respectively though numerals 28 only appear on observed face 25. Square section elements 30 are preferably loosely joined together with a elongated flexible unit 33 through eyelets 34 at at least one end 35 of square section elements 30 though it is preferred that eyelets 34 are disposed at both ends 35, 36 in order to maintain teaching aid 10 in a tabular form to present table 11 as a multiplication table when all square section elements 30 are joined together with bottom faces 37 and top faces 38 abutting and elongated flexible unit 33 is passed straight through eyelets 34 along both ends 35, 36. Since elongated flexible unit 33 is substantially longer than the sum of the thicknesses of square section elements 30, square section elements 30 may be manipulated into any of multiple configurations to present rows 14 showing various fractional pairs. In fact, in the preferred embodiment, it was not possible to show fractional pairs in rows 14 beginning with the numbers 4 and 12 with other fractional pairs in rows 14 beginning with the numbers 1, 3 and 9 as row 14 beginning with the number 4 would be folded under rows 14 beginning with numbers 3 and 9. In this embodiment, all rows 14 of fractional pairs of 1/3 may be displayed together and even displaced laterally to line up the equivalents. For instance, in a 12 row, 12 column grid, all the available rows 14 showing fractional pairs of 1/3 would look like:

TABLE 5

| 1 | 2 | 3  | 4  | 5  | 6  | 7  | 8  | 9  | 10  | 11  | 12  |
|---|---|----|----|----|----|----|----|----|-----|-----|-----|
| 3 | 6 | 9  | 12 | 15 | 18 | 21 | 24 | 27 | 30  | 33  | 36  |
| 9 | 18| 27 | 36 | 45 | 54 | 63 | 72 | 81 | 90  | 99  | 108 |
|   | 2 | 4  | 6  | 8  | 10 | 12 | 14 | 16 | 18  | 20  | 22  | 24 |
|   | 6 | 12 | 18 | 24 | 30 | 36 | 42 | 48 | 54  | 60  | 66  | 72 |
|   |   | 4  | 8  | 12 | 16 | 20 | 24 | 28 | 32  | 36  | 40  | 44 | 48 |
|   |   | 12 | 24 | 36 | 48 | 60 | 72 | 84 | 96  | 108 | 120 | 132 | 144 |

Though flexible unit 33 may seem to be some what tangled, the student can readily observe that 1/3=2/6=2/6=4/12 and also recognize all the remaining equivalent fractions. Furthermore, it is easy for the student to pair rows 14 to display improper fractions as shown in FIG. 3 by moving a row 14 with a larger number displayed proximate end 35 over a row 14 of a smaller number displayed proximate end 35. Since elongated flexible unit 33 is pliable, rows 14 in between the displayed rows 14 are displaced from the plane of the paired rows 14. Though elongated flexible unit 33 is described above as passing through eyelets 34, it is well within the scope of this invention to physically join elongated flexible unit 33 to eyelets 34 with a knot 62 or the like as shown on in eyelets 34 at end 36.

Figure 4:
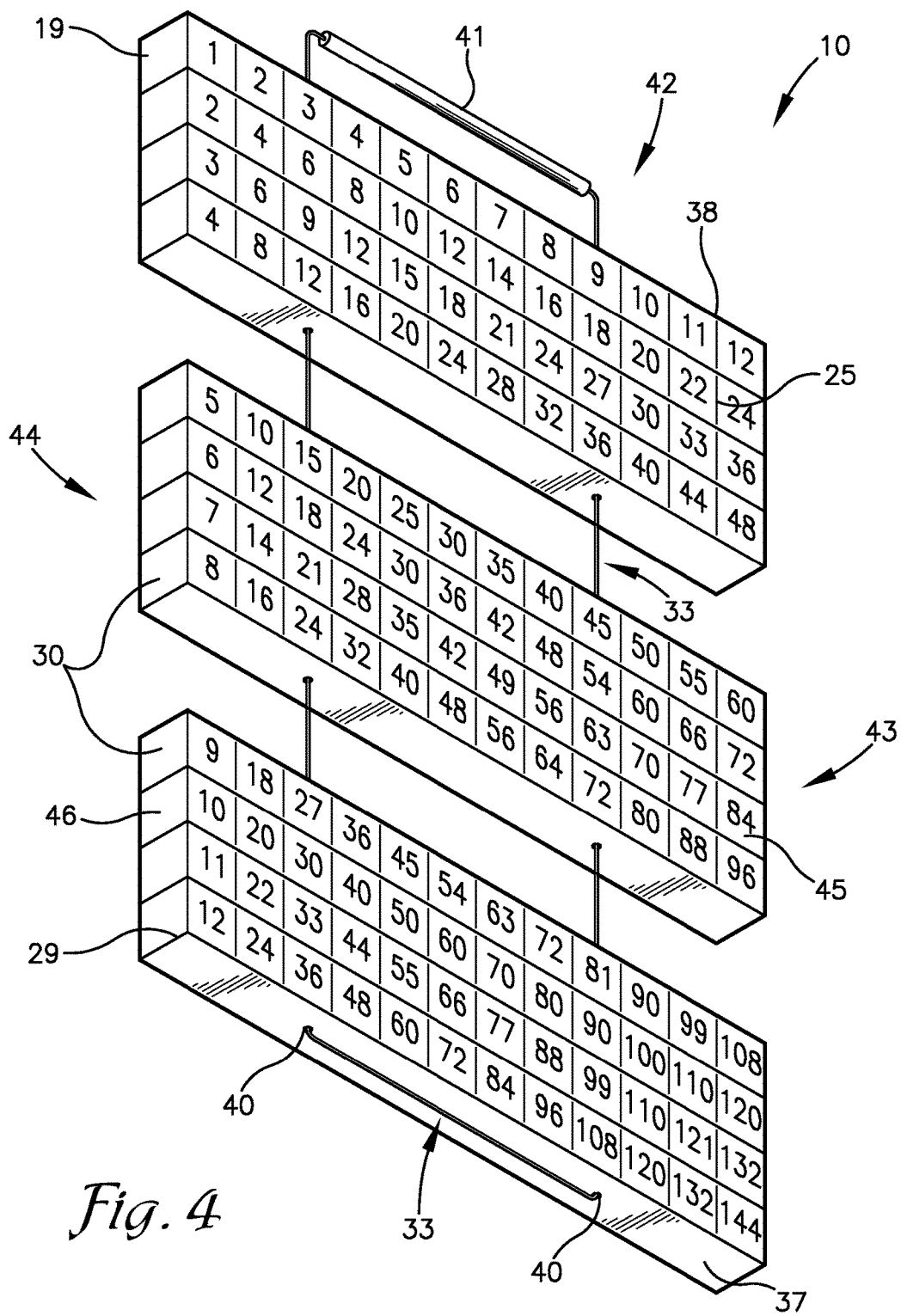
FIG. 4 is a perspective view of a second embodiment of the teaching aid of this invention with an alternate method of loosely joining the rows of FIG. 3 wherein the rows are arranged in a multiplication table but separated in sets of four to show the method of joining.

Referring now to FIG. 4, square section elements 30 may also be flexibly joined together into table 11 as shown wherein an elongated flexible unit 33 such as string, elastic band or cable is inserted through holes 40 drilled through square section elements 30 from bottom faces 37. Though FIG. 4 shows square section elements 30 arranged in sets of four, it is obvious that all square section elements 30 may be abutted to display table 11 as a multiplication table. However, as with square section elements 30 in FIG. 3, square section elements 30 of FIG. 4 may be arranged in with any row 14 arranged adjacent and abutting with any other row 14. Furthermore, rows 14 may be displaced laterally to again line up equivalent fractions as shown in Table 5 above. Elongated flexible unit 33 is preferably one length passing through all holes 40 in square section elements 30 and joined together in a handle 41 at a top end 42 of teaching aid 10, however, one elongated flexible unit 33 may pass through holes 40 spaced inwardly from right edge 43 and knotted below bottom face 37 of last row 29 and above top face 38 of first row 19. Likewise, another elongated flexible unit 33 may be threaded through all holes 40 spaced inwardly from left edge 44 and knotted under bottom face 37 of last row 29 and above top face 38 of first row 19. One side 45 of table 11 of FIG. 4 preferably has cardinal numbers 1-n spaced apart equally along observed face 25 of first row 19 and cardinal numbers 1-n each on a separate row 14 and spaced proximate left edge 44 as recited in the preferred embodiment. An opposite side 46 may present another table 11 wherein rows 14 may have additional sets of cardinal numbers n+1 through N spaced apart along first row 19 and arranged along one edge 43 or 44 depending upon the rotation of teaching aid 10. It should be readily apparent that if teaching aid 10 were rotated right to left, orientation of numbers n+1 through N would be arranged along edge 43 and if teaching aid 10 were flipped end over end, numbers n+1 through N would still be arranged along edge 44. The remainder of opposite side 46 would then be filled with the cross products of the cardinal numbers on first row 19 and cardinal numbers along either edge 43 or 44. Though additional sets of cardinal numbers n+1 through N might be so arranged, opposite side 46 may have cardinal numbers n+1 through N arranged in reverse order such that improper fractions may be displayed for use by the student.

Figure 5:
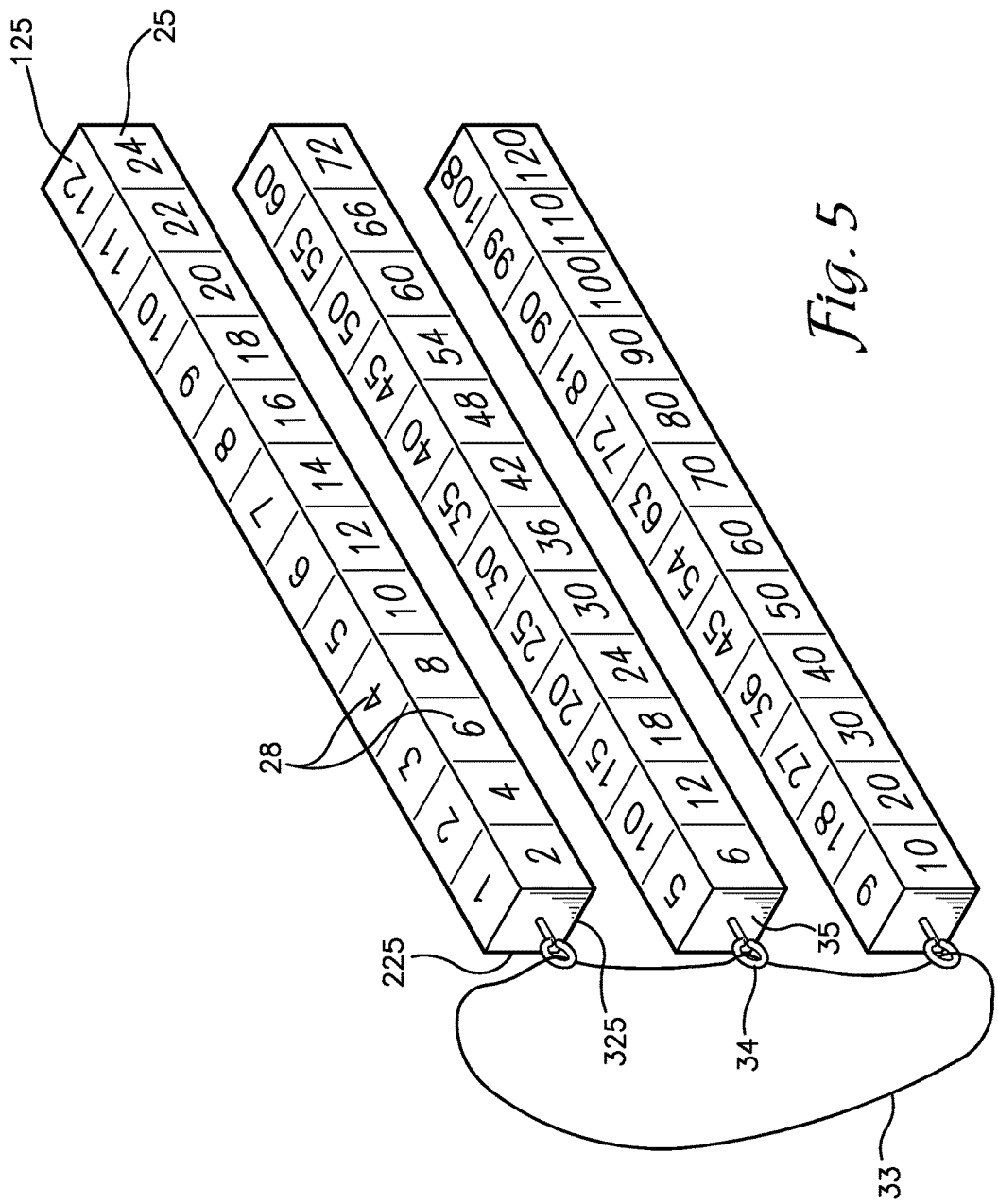
FIG. 5 is a perspective view of a third embodiment of the teaching aid of this invention with an alternate configuration of the loosely joined rows of FIG. 3 arranged in paired fractional equivalents.

FIG. 5 has numerals 28 on all faces 25, 125, 225 and 325 of square section elements 30 as shown wherein cardinal numbers 1-4 are displayed around a first square section element 30, cardinal numbers 5-8 arranged around a second square section element 30 and cardinal numbers 9-12 arranged around a third square section element 30. There are six square section elements 30, two identical to each of the three square section elements 30 just described in order to arrange fractional pairs of numbers 28 appearing on opposite faces 25, 225 or 125, 325 of each square section element 30. For instance, on first and fourth square section elements 30, observed face 25 has the #1 proximate left end 35 with the first 12 multiples of #1 evenly spaced therealong while face 125 is provided with the #2 proximate left end 35 and first 12 multiples of #2 evenly spaced. Likewise, face 225 has #3 and the first 12 multiples of 3 evenly spaced while face 325 has #4 and the first 12 multiples thereof evenly spaced. In the same manner, that both second square section elements 30 have the number #5 on observed face 25 and the first 12 multiples of #5, face 125 has #6 and the first 12 multiples thereof, face 225 has #7 and its 12 multiples while face 325 has #8 and its multiples. It follows then that the third square section element 30 had #9 on observed face 25, #10 on face 125, #11 on face 225 and #12 on face 325 with the first 12 multiples of the respective numbers therefollowing. It is quite apparent then to use first square section element 30 and fourth square section element 30 to display ⅓ as #1 is observed face 25 of first and fourth square section elements 30 while #3 is on the reverse face 225. As with square section elements 30 of FIGS. 3 and 4, all six square section elements 30 are loosely joined together with an elongated flexible unit 33, such as a string, elastic band or cable. Though teaching aid 10 of FIG. 5 does not reinforce the multiplication table as well as most of the others because the original state of the structure is not in multiplication table form, its quick pairing of separate faces 25, 125, 225 and 325 of the six square section elements 30 is beneficial to kinesthetic learners as manual manipulation of the square section elements 30 is an important facet of learning for these learners. It is also important to note that both proper fractions and improper fractions may be readily observed.

Figure 6:
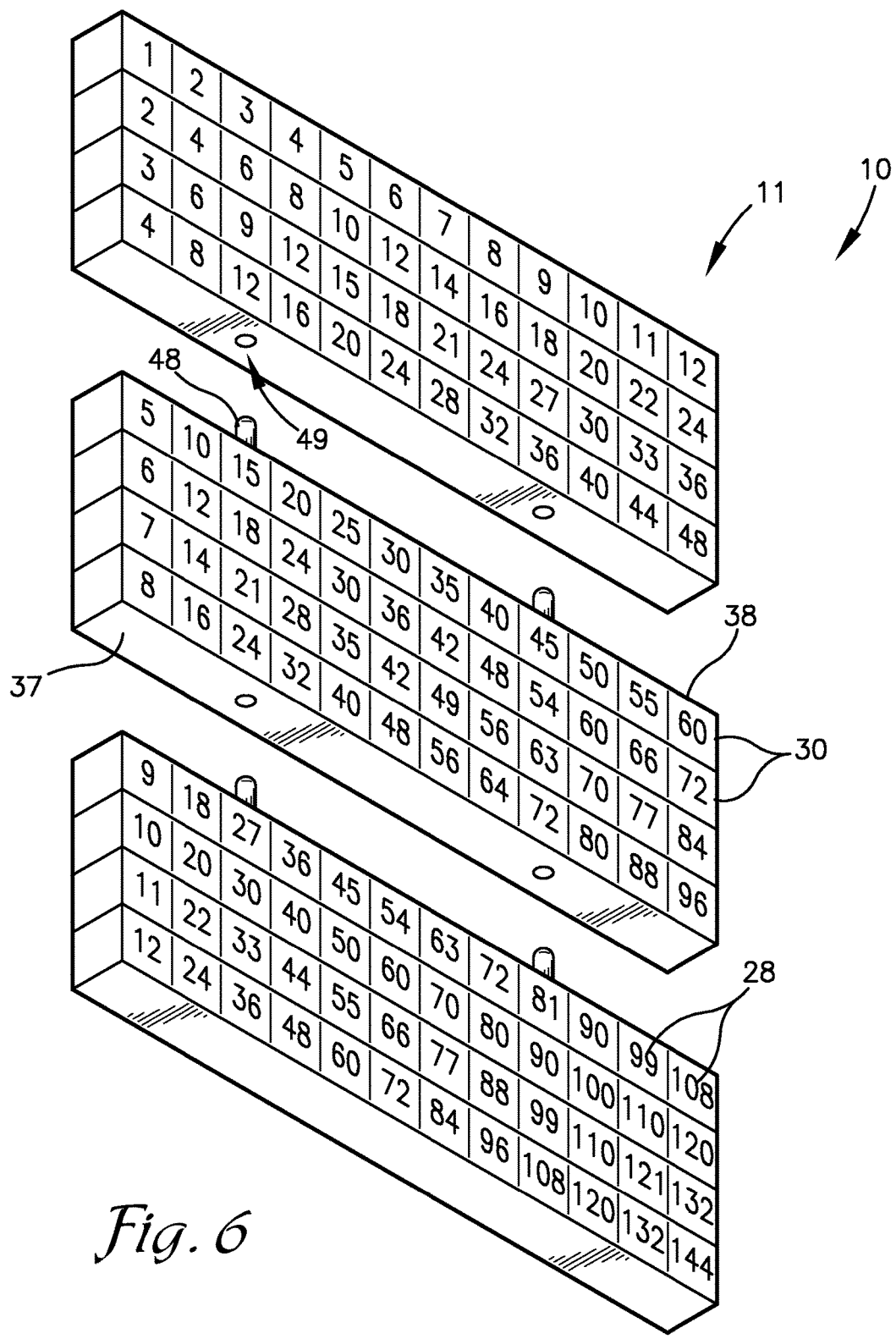
FIG. 6 is an perspective view of a fourth embodiment of the teaching aid of this invention with an alternate method of joining each bar of the rows of FIG. 3, the rows are arranged in a multiplication table but separated in sets of four to show the method of joining.

Referring now to FIG. 6, in yet another embodiment using square section elements 30 of FIG. 3, twelve square section elements 30 are separably joined together with mating pegs 48 and holes 49 such that any square section element 30 may be separably joined to any other square section element 30. Thus, the top face 125 of each square section element 30 has at least two male pegs 48 protruding therefrom that mate into matching holes 49 in bottom face 325 of another square section element 30. This structure allows the student to separate a row 14 of one square section element 30 with another row 14 of another square section element 30 to produce the desired fraction. After juncture of the desired square section elements 30 together, the student readily observes all the equivalent fractions associated with the numerals 28 displayed on the two square section elements 30. It should be obvious that both proper and improper fractions may be displayed by pairing of two or more square section elements 30. Preferably, all square section elements 30 are also flexibly joined together with an elongated flexible unit 33 such as a string, a cable or elastic band such that the integrity of the set is maintained. Thus, teaching aid 10 can be stored with all square section elements 30 lodged into each other in proper sequence creating a original multiplication table. In a similar manner, each face 25, 125, 225 and 325 of first, third and fifth square section elements 30 of FIG. 5 may be provided with two male pegs 48 protruding therefrom and second, fourth and sixth square section elements 30 are provided with holes 49 in all faces 25, 125, 225 and 325 any proper or improper fraction within the set of numerals 28 on square section elements 30 may be displayed by joining together one square section element 30 from the first group and one square section element 30 of the second group.

Figure 7:
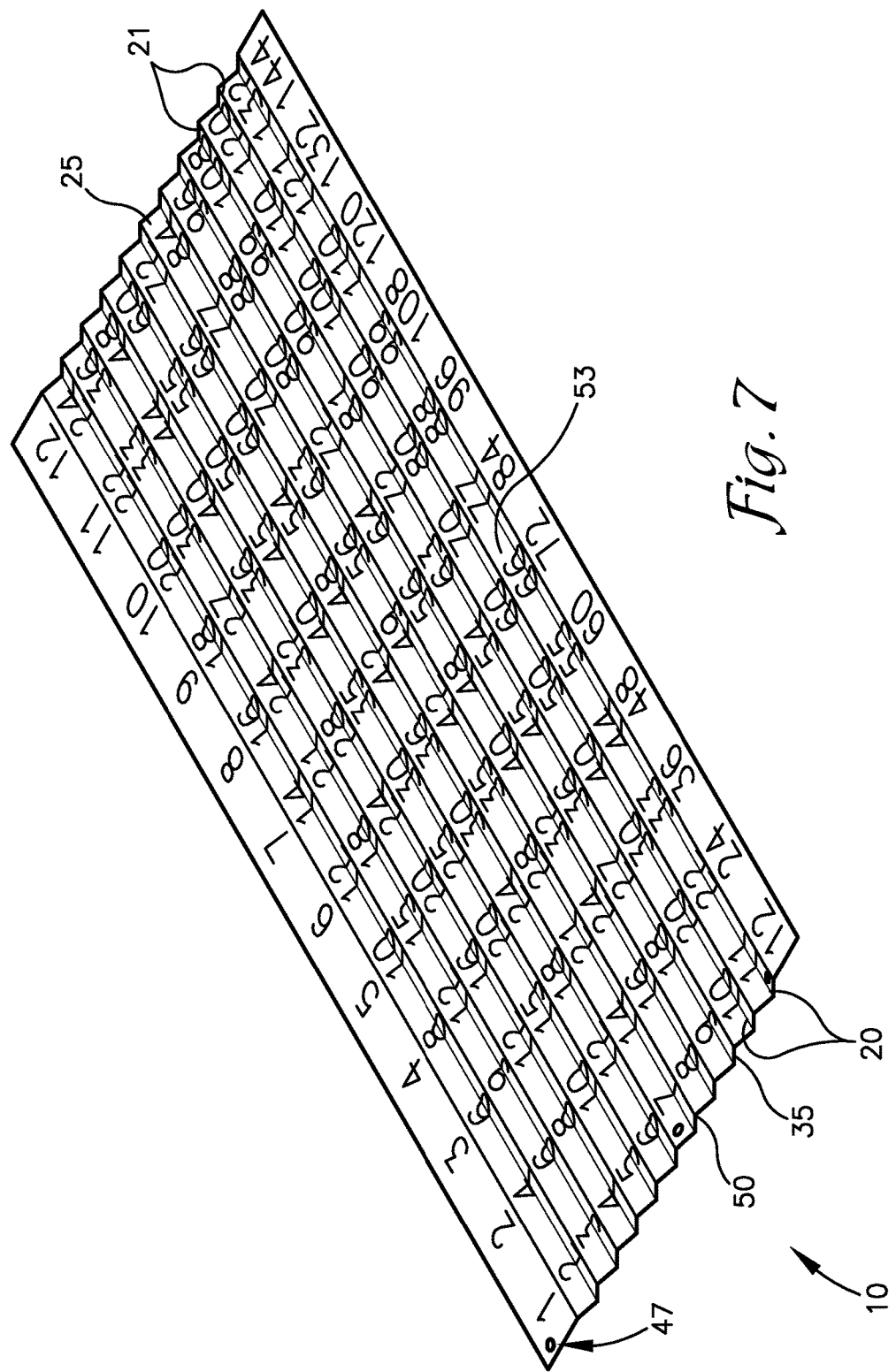
FIG. 7 is an perspective view of a fifth embodiment of the teaching aid of this invention.

Turning now to FIG. 7, teaching aid 10 may be of minimal thickness simply made of a scored sheet of flat material such as plastic. In order to best accomplish folding for ease of manipulation, central line 20 would be scored on observed face 25 such that it would bend readily upwardly to be joined with any other juncture 21 while juncture 21 would be scored on a reverse side 50 such that rows 14 of numerals 28 could be folded below a plane of teaching aid 10. The student would use teaching aid 10 of FIG. 7 in the same manner as teaching aid 10 of FIGS. 1 and 2. Teaching aid 10 of FIG. 7 is preferably provided with binder holes 47 along left end 35 for placement in a three ring binder. Teaching aid 10 of FIG. 7, of course, can be stored in a file folder or pocket folder for ready retrieval by the student.

Figure 8:
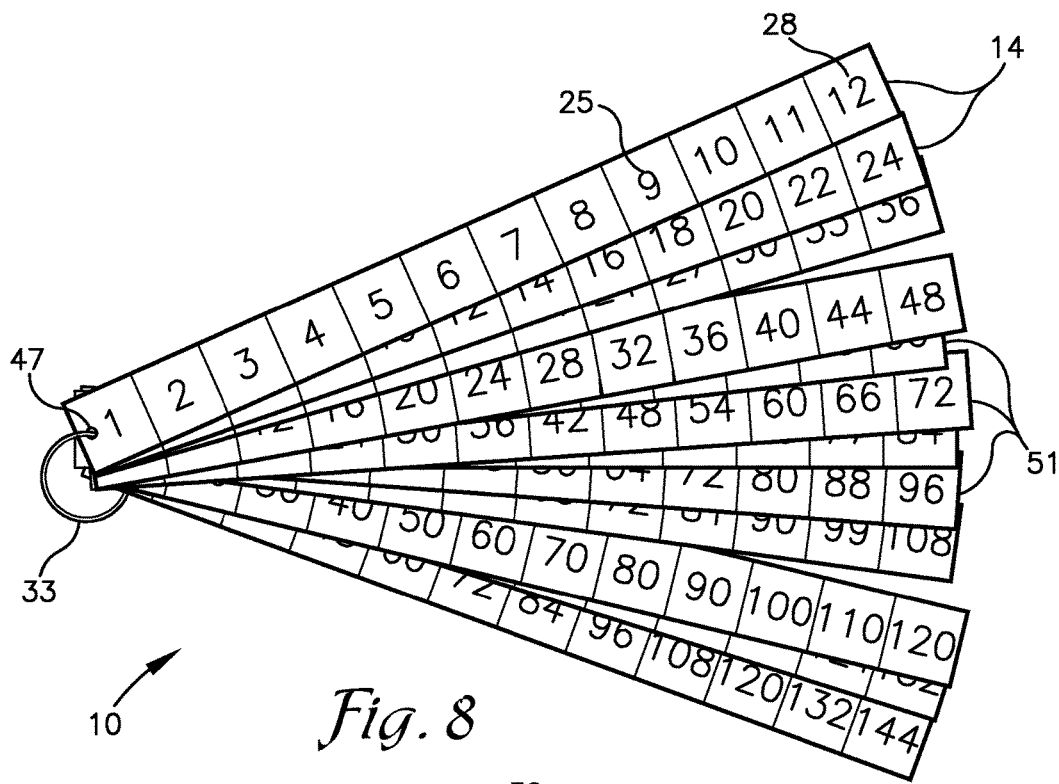
FIG. 8 is a plan view of a sixth embodiment of the teaching aid of this invention.

Teaching aid 10 of FIG. 8 may also take the form of individual semi-rigid flat sheets 51 with rows 14 of numerals 28 displayed upon faces 25 thereof. Each semi-rigid flat sheet 51 is provided with a binder hole 47 through one end thereof such that the student may store semi-rigid sheets 51 in a binder or semi-rigid sheets 51 may be loosely joined together with an elongated flexible unit 33 such as a string, elastic band or a cable.

Teaching aid 10 of FIG. 8 is as easy to use as any other embodiment and may be most beneficial to students who have difficulty holding and/or manipulating a larger unit such as teaching aid 10 of FIG. 1. The student may separate semi-rigid sheets 51 and arrange semi-rigid sheets 51 in a variety of configurations to learn fractions and fractional equivalents. Since semi-rigid sheets 51 are readily separable, all equivalent fractions of the entire set of numerals 28 contained on semi-rigid sheets 51 may be arranged as shown in Table 5 above. Improper fractions may be displayed as readily as proper fractions and thus the student learns both from the various arrangements of semi-rigid sheets 51.

In a method of manufacturing teaching aid 10 of FIGS. 1 and 2, the twelve (12) trapezoidal section elements 15 are divided along central line 20 into twenty four (24) right angle trapezoid halves 16, 17. Top half 16 and bottom half 17 are identical in cross sectional shape but reversed such that flat faces 31, 32 thereof abut at central line 20 and observed face 25 is disposed at a right angle to central line 20. Top half 16 and bottom half 17 are joined together at central line 20 with living hinges 52 by applying flexible material 53 such as an elastomeric or elastomeric coated material to observed face 25 thereof wherein flexible material 53 has living hinges 52 aligned with central lines 20 and junctures 21. Numerals 28 may be applied directly to trapezoid halves 16, 17 with each numeral 28 spanning across living hinge 52 at central line 20 or numerals 28 may be embedded into flexible material 53 directly across living hinge 52 at central line 20. Thus, though there are twenty four (24) trapezoid halves 16, 17 there are only twelve (12) rows 14 of numerals 28. Trapezoidal section elements 15 have thickness 54 which helps a young student to hold and manipulate each trapezoidal section element 15 and to fold trapezoid halves 16, 17 inwardly easily. Though all rows 14 may be so constructed, generally first row 19 and last row 29 are not divided along central line 20 as shown in FIG. 1. Trapezoid halves 16, 17 are preferably formed materials selected from the group consisting of wood, metal and elastomers or combinations thereof, however it is preferred for economic reasons to form trapezoid halves 16, 17 from extruded elastomeric materials selected from the group consisting of epoxy, acrylic, vinyl ester, methyl methacrylate, isophthalic polyester, terephthalic polyester, orthophthalic polyester, dicyclopentadiene and polyurethane, or combinations thereof, or rigid polymeric material selected from the group consisting of acetals, vinyls, tetrafluoroethylenes, propylenes, ethylenes, styrenes, amides, amide-imides, parabenzamides, vinylchlorides, carbonates, ABS, acrylates, or combinations thereof. As living hinges 52 are provided at central lines 20 and junctures 21 and as trapezoidal section elements 15 have the shorter bases 55 remotely disposed from flexible material 53, trapezoid halves 16, 17 may be folded inwardly at central line 20 while trapezoidal section elements 15 may be flexibly moved relative to each other to allow different rows 14 of numerals 28 to be adjacently disposed to accomplish the objects of this invention of teaching fractions and fractional equivalents to kinesthetic students as well as the general student population.

Square section elements 30 of FIGS. 3-6 are also formed from material selected from the group consisting of wood, metal and elastomers or combinations thereof, however, square section elements 30 are also preferably extruded from the above mentioned elastomeric materials. Square section elements 30 are loosely joined together with at least one elongated flexible unit 33 disposed through eyelets 34 inserted into ends 35, 36 of square section elements 30 such that individual square section elements 30 cannot be lost but can be manipulated into multiple positions to accomplish the objects of this invention and thus advance understanding of basic mathematic principles to achieve the goals of STEM. Elongated flexible unit 33 may be a twisted or braided string, cable or small diameter rope as well as a stretchable material such as an elastic string. Elongated flexible units 33 are preferably joined into complete loops at each end 35, 36 of square section elements 30 or may be joined into a single loop at a handle 41 with elongated flexible unit 33 passing through a plurality of holes 40 disposed through square section elements 30 as shown in FIG. 4. Alternately, as shown in FIG. 6, square section elements 30 may also be separably joined together with pegs 48 protruding from top face 38 of square section element 30 and adapted to be aligned with holes 49 drilled into bottom face 37 of another square section element 30. Though square section elements 30 have been described, it is fully within the scope of this invention to make element 30 any other shape such as round, oval or polygonal wherein rows 14 of numerals 28 are spaced around the periphery of element 30.

Figure 9:
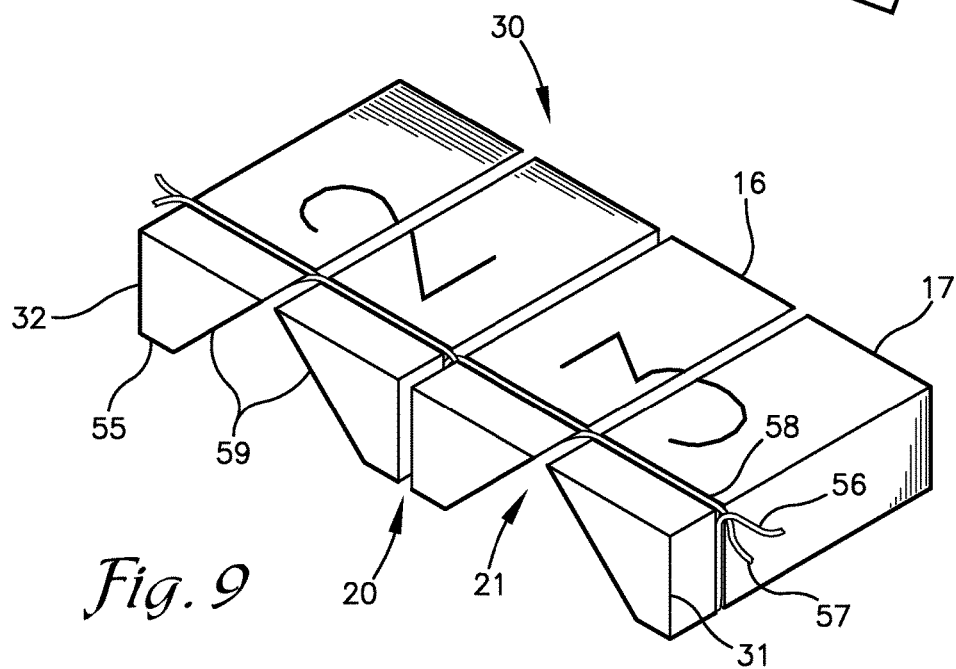
FIG. 9 is a perspective view of two rows of trapezoid halves of the teaching aid of this invention joined together with weaving.

An alternate method of manufacture of teaching aid 10 of this invention is generally shown in FIG. 9 wherein trapezoid halves 16, 17 of trapezoidal section elements 15 are joined together with weaving such as Chinese calendar weaving. A pair of threads 56, 57 are disposed in grooves 58 in at least one of observed face 25, abutting flat faces 31, 32, base 55 or angled face 59 of every trapezoid half 16, 17 and more preferably in at least two faces 25, 31, 32, 55 and 59. Threads 56, 57 are crossed at each of juncture 21 and central line 20 such that teaching aid 10 may be flexibly manipulated into the various configurations to present to the student the multiple fractions and fractional equivalents. Multiple pairs of threads 56, 57 are disposed into multiple grooves 58 in each trapezoid half 16, 17 across the width of teaching aid 10 such that teaching aid 10 is an integral unit. Each pair of threads 56, 57 is joined together at top face 61 of first row 14 and at bottom face 60 of last row 29. Threads 56, 57 obviously need to be of sufficient strength to permit repeated flexing of teaching aid 10.

In an alternate method of making teaching aid 10 of FIG. 7, teaching aid 10 is wholly formed of flexible material 53 which may be a calendered elastomeric sheet or a woven or non-woven fibrous material impregnated with an elastomeric material and/or calendered with a coating of elastomeric material. The elastomeric material used for flexible material 53 may be selected from the group consisting of epoxy, acrylic, vinyl ester, methyl methacrylate, isophthalic polyester, terephthalic polyester, orthophthalic polyester, dicyclopentadiene and polyurethane, or combinations thereof, or rigid polymeric material selected from the group consisting of acetals, vinyls, tetrafluoroethylenes, propylenes, ethylenes, styrenes, amides, amide-imides, parabenzamides, vinylchlorides, carbonates, ABS, acrylates, or combinations thereof. Thus, teaching aid 10 of FIG. 7 is of minimal thickness, i.e. the object is substantially flat. Preferably, flexible material 53 has creases at junctures 21 and central lines 20 such that rows 14 may be displaced out of plane to join together rows 14 of different numerals 28 to present to the student the fractions and fractional equivalents thus again accomplishing the objects of this invention.

In all embodiments described above, it is fully within the scope of this invention to disposed numerals upon faces 25, 125, 225, 325 by any method selected from a group consisting of embossing, engraving, painting, applying, molding, machining, printing or combinations thereof.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A mathematics teaching aid comprising a plurality of elongated identical halves, said halves each comprising a right-angle trapezoid cross section with a non-parallel side disposed opposite said right-angle, said non-parallel side disposed at an acute angle relative to one leg of said right-angle, said halves reversed with respect to each other into pairs of said halves, each pair of said elongated trapezoidal halves flexibly joined together along a central line therebetween, said pairs of elongated trapezoidal halves arranged as a plurality of trapezoidal rows, said trapezoidal rows flexibly joined together at a juncture of adjacent vertexes of said acute angles of said right-angle trapezoid cross sections therebetween, said plurality of trapezoidal rows comprising a tabular unit having a width and length thereof, said tabular unit rigid in an horizontal direction and flexible in a vertical direction, each of said trapezoidal rows provided with numerals on at least one face thereof wherein each of said halves includes a portion of each of said numerals, wherein each said trapezoidal row is placeable adjacent any other said trapezoidal row by folding pairs of said elongated identical halves below a desired fractional set to place a numerator of a fraction above a denominator of a fraction thus presenting a plurality of equivalent fractional units to a learner manipulating said plurality of elongated trapezoidal halves, a first said trapezoidal row provided with consecutive cardinal numbers arranged upon an observed face thereof, successive said trapezoidal rows provided with different cardinal numbers arranged upon a observed face thereof proximate one end thereof wherein said first and said successive trapezoidal rows present multiples of said cardinal numbers in tabular form and equivalent fractions upon said observed face thereof.

2. A mathematics teaching aid as in claim 1 wherein said pairs of elongated trapezoidal halves are attached at said central line with a flexible membrane.

\* \* \* \* \*